(12) United States Patent
Zock et al.

(10) Patent No.: US 11,466,413 B2
(45) Date of Patent: Oct. 11, 2022

(54) SILT FENCE CONFIGURED FOR CAPTURING POLLUTANTS

(71) Applicants: MKB Company, LLC, Groveport, OH (US); Huesker, Inc., Charlotte, NC (US)

(72) Inventors: Michael A. Zock, Saxonburg, PA (US); Roy G. McClinton, Waxhaw, NC (US)

(73) Assignees: MKB COMPANY, Groveport, OH (US); HUESKER, INC., Charlotte, NC (US)

( * ) Notice: Subject to any disclaimer, the term of this patent is extended or adjusted under 35 U.S.C. 154(b) by 957 days.

(21) Appl. No.: 16/207,610

(22) Filed: Dec. 3, 2018

(65) Prior Publication Data

US 2019/0145068 A1    May 16, 2019

Related U.S. Application Data

(63) Continuation of application No. PCT/US2017/037563, filed on Jun. 14, 2017.
(Continued)

(51) Int. Cl.
*E02D 17/20* (2006.01)
*E01F 7/02* (2006.01)
(Continued)

(52) U.S. Cl.
CPC ............... *E01F 7/02* (2013.01); *B32B 3/08* (2013.01); *B32B 5/022* (2013.01); *B32B 5/024* (2013.01); *B32B 5/06* (2013.01); *B32B 5/26* (2013.01); *B32B 7/023* (2019.01); *C02F 1/004* (2013.01); *E02B 3/023* (2013.01); *E02D 17/20* (2013.01);
(Continued)

(58) Field of Classification Search
CPC . E02D 17/20; E02B 3/02; E02B 3/023; E02B 3/122; E01F 7/02
See application file for complete search history.

(56) References Cited

U.S. PATENT DOCUMENTS 4,756,511 A   7/1988  Wright, III
5,108,224 A *  4/1992  Cabaniss ............... D03D 15/00
                                                256/12.5
(Continued)

FOREIGN PATENT DOCUMENTS

CN     110079912 A  *  8/2019
KR   20060082111 A  *  7/2006
WO      2017218711     12/2017

*Primary Examiner* — Frederick L Lagman
(74) *Attorney, Agent, or Firm* — Blynn L. Shideler; Krisanne Shideler; BLK Law Group

(57) ABSTRACT

A composite silt fence configured for capturing pollutants in one embodiment comprises a silt fence fabric including i) a polymeric geotextile fabric particulate filtering layer defining the hydraulic flow capacity for the silt fence, ii) a pollutant capturing layer coupled to the polymeric geotextile fabric particulate filtering layer and configured to capture some select pollutants in water from flow that has passed through the polymeric geotextile fabric particulate filtering layer, and iii) a backing layer coupled to the pollutant capturing layer; and a plurality of stakes secured to the silt fence fabric at spaced locations. The silt fence fabric yields higher hydraulic flow than existing fence constructions with greater sediment retention and pollutant containment features.

18 Claims, 1 Drawing Sheet

Related U.S. Application Data

(60) Provisional application No. 62/349,890, filed on Jun. 14, 2016.

(51) Int. Cl.

| | | |
|---|---|---|
| *E02B 3/02* | (2006.01) | |
| *B32B 5/02* | (2006.01) | |
| *B32B 5/06* | (2006.01) | |
| *B32B 3/08* | (2006.01) | |
| *B32B 5/26* | (2006.01) | |
| *E02D 31/06* | (2006.01) | |
| *B32B 7/023* | (2019.01) | |
| *C02F 1/00* | (2006.01) | |
| *E02D 29/02* | (2006.01) | |
| *E04H 17/20* | (2006.01) | |

(52) U.S. Cl.
CPC ........... *E02D 17/202* (2013.01); *E02D 29/02* (2013.01); *E02D 31/06* (2013.01); *E04H 17/20* (2013.01); *B32B 2250/03* (2013.01); *B32B 2250/20* (2013.01); *B32B 2262/0253* (2013.01); *B32B 2262/06* (2013.01); *B32B 2307/718* (2013.01)

(56) References Cited

U.S. PATENT DOCUMENTS

| | | | |
|---|---|---|---|
| 5,201,497 A * | 4/1993 | Williams | E01F 13/028 |
| | | | 256/12.5 |
| 5,660,505 A | 8/1997 | Emory, III | |
| 5,758,868 A | 6/1998 | Shea | |
| 5,877,096 A * | 3/1999 | Stevenson | E02D 29/0241 |
| | | | 442/36 |
| 6,053,665 A | 4/2000 | Richardson | |
| 6,945,739 B1 | 9/2005 | Putman | |
| 7,008,143 B1 | 3/2006 | Wolfe | |
| 7,157,010 B1 | 1/2007 | Wolfe | |
| 7,465,129 B2 | 12/2008 | Singleton | |
| 7,736,097 B2 * | 6/2010 | D'Andreta | B32B 5/22 |
| | | | 405/15 |
| 7,901,160 B2 * | 3/2011 | D'Andreta | B32B 5/22 |
| | | | 405/302.6 |
| RE42,695 E | 9/2011 | Singleton | |
| 8,465,230 B1 | 6/2013 | O'Reilly | |
| 8,465,231 B2 * | 6/2013 | Christopher | E02B 3/04 |
| | | | 405/302.7 |
| 8,747,027 B1 | 6/2014 | Singleton | |
| 9,562,350 B1 * | 2/2017 | Witt | E02B 8/02 |
| 2003/0010968 A1 * | 1/2003 | Hendrickson | E02B 3/04 |
| | | | 256/12.5 |
| 2006/0133900 A1 * | 6/2006 | Singleton | E02D 17/20 |
| | | | 405/302.7 |
| 2008/0112766 A1 * | 5/2008 | Kerman | E02D 17/20 |
| | | | 405/302.7 |
| 2008/0181730 A1 * | 7/2008 | D'Andreta | E01F 7/02 |
| | | | 405/302.6 |
| 2014/0072375 A1 * | 3/2014 | Ortega | E02D 17/20 |
| | | | 405/302.7 |
| 2014/0154018 A1 | 6/2014 | Singleton | |
| 2017/0204582 A1 * | 7/2017 | Allard | E02D 17/202 |
| 2019/0186098 A1 * | 6/2019 | Hau | E02D 37/00 |
| 2019/0203434 A1 * | 7/2019 | Segroves | D03D 15/43 |
| 2020/0370251 A1 * | 11/2020 | Zock | E01F 7/02 |
| 2021/0180281 A1 * | 6/2021 | Powell | E02D 17/202 |

* cited by examiner

SILT FENCE CONFIGURED FOR CAPTURING POLLUTANTS

CROSS-REFERENCE TO RELATED APPLICATIONS

This application is a continuation of International Patent Application Serial Number PCT/US17/37563 filed Jun. 14, 2017 and published Dec. 21, 2017 as WO 2017-218711, which publication is incorporated herein by reference. International Patent Application Serial Number PCT/US17/37563 claims the benefit of U.S. Provisional Patent Application Ser. No. 62/349,890, entitled "Silt Fence Configured for Capturing Pollutants", filed on Jun. 14, 2016, which is incorporated herein by reference.

BACKGROUND OF THE INVENTION

1. Field of the Invention

The present invention relates to silt fences, more specifically to a silt fence capturing pollutants from storm water.

2. Description of Related Art

A silt fence, sometimes called a "filter fence," is a temporary sediment control device used on construction sites to protect water quality in nearby streams, rivers, lakes and seas from sediment (loose soil) in storm-water runoff. Silt fences are widely used on construction sites in North America and elsewhere, due to their low cost and simple design.

Silt fences are often perimeter controls and a typical fence consists of a piece of synthetic filter fabric (also called a geotextile) stretched between a series of wooden or metal fence stakes along a horizontal contour level. The stakes are generally installed on the downhill side of the fence, except sometimes at overlapping silt fence sections, and the bottom edge of the fabric can be trenched into the soil.

Hanes Geo Components manufactures a representative sample of commercially available silt fence geotextiles, such as the TERRATEX® SF-50, TERRATEX® SF-90, TERRATEX® SF-D, and NTPEP brands which generally are woven geotextiles made up of woven polypropylene filaments that are considered non-biodegradable and resistant to most soil chemicals, acids, and alkali with a pH range of 3 to 12.

In general, each state Department of Environmental Protection or similar agency will define the particulars for the silt fence in that jurisdiction, often in a "Best Management Practices for Erosion and Sedimentation Control" entitled regulation. These particulars include minimum requirements for the fabric (strength, lifespan, flowrate, materials, etc), height requirements for the fences and stakes, material, size and spacing requirements for the stakes, etc.

The patent literature discusses and describes the state of the art in silt fence construction, as well as including some proposals that have not been commercially viable. See for example U.S. Pat. Nos. 4,756,511, 5,660,505, 5,758,868, 6,053,665, 6,945,739, 7,008,143, 8,465,230 and 8,747,027 which are incorporated herein by reference. Collectively these patents also give an acceptable overview of existing silt fence technologies.

U.S. Pat. No. 7,157,010 proposes an interesting silt fence construction and discloses a polymeric flocculant infused silt fence assembly comprising two opposing and attached geotextile sheets, each adapted to filter entrained non-colloidal particles and together encasing a layer of polymeric flocculant material. The polymeric flocculant material preferably comprises anionic polyarylmide. As water flow is flowed through the first geo-fabric sheet any entrained non-colloidal particles above the mesh size are filtered. Then the polymeric flocculant material coagulates a portion of the colloidal particles and forms flocs in the flowing water and the second geo-fabric sheet filters remaining entrained non-colloidal particles, including the coagulated flocs. The concept of adding to the functional performance of the silt fence in this application is desirable, but this implementation will have blinding problems that undesirably interferes with the flow characteristics of the silt fence.

U.S. Publication 2014-0154018 and U.S. Pat. No. 7,451,129 (No Re42,695) all disclose reinforced silt retention sheet and systems for silt retention wherein the reinforced silt retention sheet includes a non-woven fabric having a series of entangled polymer fibers with a reinforcing material secured within the fabric. The resultant reinforced silt retention sheet further can have openings of a desired size to enable filtering of a flow of fluid passing through the reinforced silt retention sheet. Improving strength and flow characteristics of a silt fence is helpful but does not address the need for removing pollutants from a water stream.

There is a need for a silt fence with improved silt fence fabrics and which provide for capturing pollutants from storm water.

SUMMARY OF THE INVENTION

The present invention provides a composite silt fence comprising a plurality of spaced stakes and a composite silt fence fabric coupled to the stakes and configured for capturing pollutants within storm water. Using standard ASTM testing with 1645 LBS water with 105 LBS soil and 250 mg/L Oil for 75 minutes test run followed by a 1645 LBS water flushing run for 90 minutes the silt fence of the present invention yields a soil retention after the test run of greater than 85%, preferably greater than 90% and more preferably greater than 92%. In this standardized testing the silt fence of the present invention yields a seepage rate after the test run of greater than 60%, preferably greater than 65% and more preferably greater than 70%. In this standardized testing the silt fence of the present invention yields an oil retention rate after the test run of greater than 90%, preferably greater than 95% and more preferably greater than 99%. In this standardized testing the silt fence of the present invention yields a seepage rate after the flushing run of greater than 70%, preferably greater than 75% and more preferably greater than 80%. In this standardized testing the silt fence of the present invention yields an oil retention rate after the flushing run of greater than 85%, preferably greater than 90% and more preferably greater than 95%.

One aspect of the present invention provides a composite silt fence that comprises a silt fence fabric including i) a polymeric geotextile fabric particulate filtering layer defining the hydraulic flow capacity for the silt fence, ii) a pollutant capturing layer coupled to the polymeric geotextile fabric particulate filtering layer and configured to capture some select pollutants in water that has passed through the polymeric geotextile fabric particulate filtering layer, and iii) a backing layer coupled to the pollutant capturing layer; and a plurality of stakes secured to the silt fence fabric at spaced locations. In a preferred embodiment of the present invention the polymeric geotextile fabric particulate filtering layer is a non-woven polypropylene particulate filtering layer having a 2-6 ounce rating and the backing layer is a 200-300 g/m² polyethylene layer. In one embodiment of the present invention the pollutant capturing layer is formed including a kenaf material of 1-25 mm thickness or 60-80 gram/sq. ft.

The composite silt fence according to the present invention may provide wherein the silt fence fabric has a width of 20"-48", preferably 26"-40" and most preferably 30"-36". Further the composite silt fence according to the present invention is preferably rollable, namely that the silt fence fabric, with or without the stakes, can be rolled into a coiled pack for shipping, delivery and installation.

The composite silt fence according to the present invention may provide that the pollutant capturing layer is configured to capture through absorption or adsorption at least one of hydrocarbons, heavy metals, phosphates, volatile organic compounds (VOCs), trichlorobenzenes (TCB), nitrates, arsenic, mercury, mineral oil, oil, polychlorinated biphenyls (PCBs), non-aqueous phase liquids (NAPLs), and polycyclic aromatic hydrocarbons (PAH). The composite silt fence according to the present invention may provide that the pollutant capturing layer includes one of activated carbon, calcium phosphate and oil absorbing polymers. The composite silt fence according to the present invention may provide that the pollutant capturing layer includes a hydrophobic oil absorbing polyolefin.

The silt fence according to an alternative embodiment of the present invention provides a composite silt fence that comprises a silt fence fabric including i) a woven polymeric geotextile fabric particulate filtering layer defining the hydraulic flow capacity for the silt fence, ii) a pollutant capturing layer coupled to the polymeric geotextile fabric particulate filtering layer and configured to capture through absorption or adsorption some select pollutants in water that has passed through the polymeric geotextile fabric particulate filtering layer, and iii) a woven polymeric geotextile fabric backing layer coupled to the pollutant capturing layer; and a plurality of stakes secured to the silt fence fabric at spaced locations. The woven polymeric geotextile fabric particulate filtering layer and the woven polymeric geotextile fabric backing layer of the silt fence fabric may include warp and weft threads wherein the warp threads extend substantially longitudinally along silt fence fabric while the weft threads extend generally perpendicular to the silt fence fabric and wherein the woven polymeric geotextile fabric particulate filtering layer and the woven polymeric geotextile fabric backing layer of the silt fence fabric are formed of a polyolefin or a polyamide material. The composite silt fence according to this embodiment of the present invention may provide that the pollutant capturing layer is thermally bonded to the woven polymeric geotextile fabric filtering layer and to the woven polymeric geotextile fabric backing layer.

These and other advantages of the present invention will be clarified in the detailed description of the preferred embodiments taken together with the associated figures.

DETAILED DESCRIPTION OF THE PREFERRED EMBODIMENTS

Figure 1:
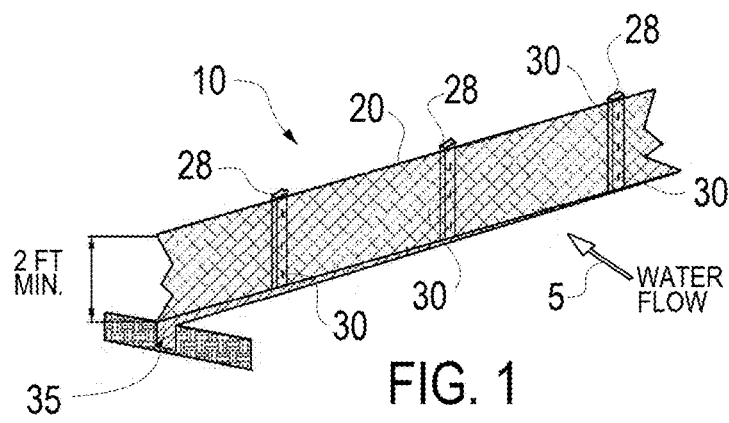
FIG. 1 schematically illustrates a silt fence configured for capturing pollutants according to one aspect of the present invention.
Figure 2:
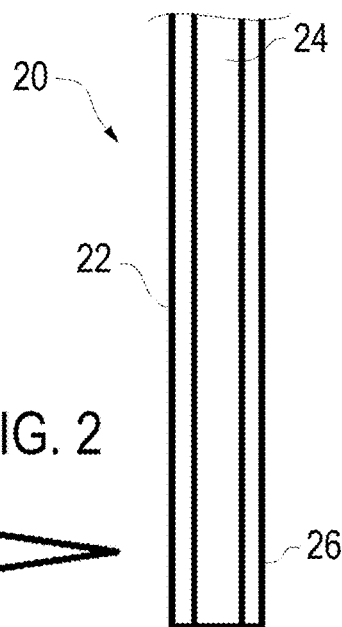
FIG. 2 is a sectional schematic side view of a composite silt fence fabric used in the silt fence of FIG. 1.

It is noted that, as used in this specification and the appended claims, the singular forms "a," "an," and "the" include plural referents unless expressly and unequivocally limited to one referent. The various embodiments and examples of the present invention as presented herein are each understood to be non-limiting with respect to the scope of the invention.

One aspect of the present invention provides a composite silt fence 10 that comprises a silt fence fabric 20 including: i) a polymeric geotextile fabric particulate filtering layer 22 defining the hydraulic flow capacity for the silt fence 10, ii) a pollutant capturing layer 24 coupled to the polymeric geotextile fabric particulate filtering layer 22 and configured to capture some select pollutants in water from flow 5 that has passed through the polymeric geotextile fabric particulate filtering layer 22, and iii) a backing layer 26 coupled to the pollutant capturing layer; and a plurality of stakes 26 secured to the silt fence fabric 20 at spaced locations via staples 30 or similar fasteners.

The stakes 28 of the silt fence 10 of the present invention are preferably formed of hardwood, or possibly metal (steel), and the fabric 20 is "stakeable" in that it can be attached to these stakes 28 by conventional methods, preferably staples 30 (staples, zip-ties, and the like). The composite silt fence fabric 20 is rollable, meaning that the fabric 20 can be rolled for shipping and installation, both with and without the stakes 28 attached.

In a preferred embodiment of the present invention the polymeric geotextile fabric particulate filtering layer 22 is a non-woven polypropylene particulate filtering layer having a 2-6 ounce rating. The non-woven polypropylene particulate filtering layer 22 promotes coupling of the layers 22, 24 And 26 together through needle punching. A "nonwoven" is a sheet, web, or batt of natural and/or man-made fibers or filaments, typically excluding paper, that have not been converted into the yarns, and that are bonded together in different ways (sometimes also called Shaped Fabrics or Yarn free Fabrics). Needle punching is a nonwoven process by which the fibers of one layer, 22, 24 or 26 are mechanically entangled to produce a coupled structure by repeated penetration of barbed needles through layers 22, 24 and 26. Specifically a needle board is mounted on a beam which is given an up and down reciprocating motion resulting in mechanically interlocked fibers, thereby providing the mechanical strength to the coupled layers to form the fabric 20.

The non-woven polypropylene particulate filtering layer 22 defines the hydraulic flow capacity for the silt fence 10, defining the lowest hydraulic flow of the layers 22, 24 and 26. Hydraulic flow is sometimes referenced by a "mesh size" which would define a given hydraulic flow under given fixed conditions. In this context the non-woven polypropylene particulate filtering layer 22 will have the lowest mesh size of the layers 22, 24 and 26. In other words the remaining layers 24 and 26 will not blind the fabric 10 in operation.

Each layer 22, 24 and 26 of the fabric has a purpose and the resulting fabric 20 as a specific preferred operational direction, namely the particulate filtering layer 22 should face the incoming water flow 5 as shown. This differs from conventional single layer silt fence structures which are omnidirectional.

The non-woven polypropylene particulate filtering layer 22 can easily add color, such as part of the binding material forming the layer 22, such that it can have a contrasting color than the backing layer 26. The distinct coloring of the layer 22 and layer 26 will give a visual indication to the installers for proper orientation. A bright orange is a preferred color choice for the layer 22 as in addition to providing a visual cue for proper installation, post installation this color will give an easily observed visual indication to operators within the construction site that they are approaching the silt fence 10, which fences are typically installed at the perimeter of site and/or around other areas of erosion control issues.

In a preferred embodiment of the present invention, the backing layer 26 is a 200-300 g/m² polyethylene layer. The backing layer 26 adds structural support to the fabric 20 and encapsulates the layer 24 allowing for wider variations for the layer 24 such as providing for a broader range of other additives that can be added in the layer 24. The backing layer 26 does not limit the hydraulic flow of the fabric 20 and also allows for staples 30, alone, to be effectively used to couple the fabric 20 to the stakes 28. Prior art fences often require the additional lath member to be used, which can also be used with the silt fence 10 of the invention but are not required. The backing layer 22 can easily add color mainly for branding and such that it can have a contrasting color than the particulate filter layer 22 for proper product orientation in the field.

The pollutant capturing layer 24 is generally configured to capture through absorption or adsorption. Adsorption is the adhesion of atoms, ions, or molecules from a gas, liquid, or dissolved solid to a surface. This process creates a film of the adsorbate on the surface of the adsorbent. This process differs from absorption, in which a fluid (the absorbate) is dissolved by or permeates a solid, or liquid (the absorbent), respectively. Adsorption is a surface-based process while absorption involves the whole volume of the material. Adsorption is a surface phenomenon.

The pollutant capturing layer 24 may be specifically configured to capture at least one of hydrocarbons, heavy metals, phosphates, volatile organic compounds (VOCs), trichlorobenzenes (TCB), nitrates, arsenic, mercury, mineral oil, oil, polychlorinated biphenyls (PCBs), non-aqueous phase liquids (NAPLs), and polycyclic aromatic hydrocarbons (PAH). In one embodiment of the present invention the pollutant capturing layer is formed including a kenaf material of 1-25 mm thickness or 60-80 gram/sq. ft., such as is available from Kengo Corporation.

The pollutant capturing layer 24 may include one of activated carbon, calcium phosphate and oil absorbing polymers. Suitable construction of the pollutant capturing layer 24 can also follow the construction of water purifying geotextiles such as available from Huesker under the TEKO-SEAL® brands.

The pollutant capturing layer 24 may also include includes a hydrophobic oil absorbing polyolefin, such as developed at Penn State University and licensed under the PETROGEL™ mark. The PETROGEL technology offers high oil-absorption capability, no water absorption, fast kinetics, easy recovery from the water's surface, and cost-effectiveness.

The pollutant capturing layer 24 is formed with a hydraulic flow rate, calculated after the containment layer 24 is at full carrying capacity, larger than flow rate of the particulate filtering layer 22. The pollutant capturing layer 24 will have an effective mesh opening size defining flow rate, calculated after the pollutant capturing layer 24 is at full carrying capacity, larger than the effective mesh size of the polymeric geotextile fabric particulate filtering layer 22.

The silt fence fabric 20 has a width of 20"-48", preferably a width of 26"-40" and most preferably a width of 30"-36". The width of the fabric 20 is measured along the length of the stakes 28 along what is the height of the fence 10.

The wooden stakes 28 generally have a length of 26"-60", preferably 30"-48", and more preferably 36"-48". Metal stakes 28 may be used with alternative fastening methods other than the staples 30, but wooden stakes 28 are cost effective and allow for use of the staples 30 as a simple coupling mechanism.

Figure 3:
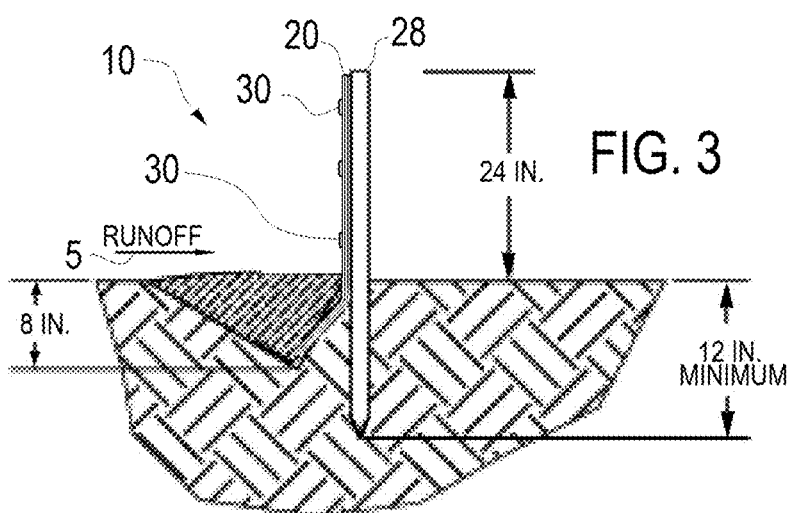
FIG. 3 is a schematic sectional side view of the silt fence of FIG. 1.

The silt fabric 20 and silt fence 10 of the present invention can be installed in the same manner as all of the prior art silt fence structures as shown in FIGS. 1 and 3, wherein the stakes extend about 1 foot into the ground and about 2 feet above and the fabric 20 extending into a backfilled 8-12" trench. The specific details of installation of the fence 10 such as regarding depth of stakes 28, height above grade of the fabric 20, the depth and width of the trench 35, length of fabric 20 extending into the trench 35, and spacing of the stakes 28 may vary from jurisdiction to jurisdiction and the needs of the particular site and are generally known in the art. The composite silt fence 10 with pollutant capturing layer 24 according to the present invention will remove pollutant in water similar in practice to that found with filter socks.

A preferred silt fence 10 of the present invention was tested using standard ASTM testing, with the fence fabric 20 having the polymeric geotextile fabric particulate filtering layer 22 formed a a non-woven polypropylene particulate filtering layer 22 having a 2-6 ounce rating and the backing layer 26 formed as a 200-300 g/m² polyethylene layer 26 and the pollutant capturing layer 24 formed including a kenaf material of 1-25 mm thickness or 60-80 gram/sq. ft. The ASTM testing was performed under the ASTM D 6459 Standard Test Method for Determination of Rolled Erosion Control Product (RECP) Performance in Protecting Hillslopes from Rainfall and Erosion, with the testing protocol that was in effect as of February 2017. Specifically the standard ASTM testing was performed with 1645 LBS water with 105 LBS soil and 250 mg/L Oil for 75 minutes test run followed by a 1645 LBS water flushing run for 90 minutes. The silt fence 10 of the present invention yields a soil retention after the test run of greater than 85%, preferably greater than 90% and more preferably greater than 92%, with test results of 92.31% being observed. In this standardized testing the silt fence 10 of the present invention yields a seepage rate after the test run of greater than 60%, preferably greater than 65% and more preferably greater than 70%, with test results of 70.91% being observed. In this standardized testing the silt fence 10 of the present invention yields an oil retention rate after the test run of greater than 90%, preferably greater than 95% and more preferably greater than 99%, with test results of 99.29% being observed. In this standardized testing the silt fence 10 of the present invention yields a seepage rate after the flushing run of greater than 70%, preferably greater than 75% and more preferably greater than 80%, with test results of 81.09% being observed. In this standardized testing the silt fence 10 of the present invention yields an oil retention rate after the flushing run of greater than 85%, preferably greater than 90% and more preferably greater than 95%, with test results of 96.78% being observed.

An alternative embodiment to the above described preferred embodiment provides silt fence 10 configured for capturing pollutants from storm water and one embodiment comprising a composite silt fence fabric 20 including i) a woven polymeric geotextile fabric particulate filtering layer 22 exhibiting the minimum mesh size of the silt fence; ii) a pollutant capturing layer 24 (also called a contaminant capturing layer) thermally bonded to the woven polymeric geotextile fabric filtering layer 22 and configured to capture through absorption or adsorption some select pollutants in water that has passed through the woven polymeric geotextile fabric layer; and iii) a woven polymeric geotextile fabric backing layer 26 bonded to the pollutant capturing layer 24 and having a mesh size greater than the filtering layer mesh size; and a plurality of stakes 28 secured to the silt fence fabric at spaced locations. The woven polymeric geotextile fabric particulate filtering layer 22 may includes warp and weft threads wherein the warp threads extend substantially longitudinally along the silt fence fabric, while the weft threads extend generally perpendicular to the longitudinal axis or generally aligned with the axis of the stakes 28. The woven polymeric geotextile fabric particulate filtering layer 22 of the invention be effectively formed using warp knitting technology on a RASCHELL Warp Knitted Double Needle Bar Machine. The woven polymeric geotextile fabric particulate filtering layer 22 is preferably formed in this alternative embodiment of a polyolefin or a polyamide material suitable for warp knitting technology and suitable to form an acceptable silt fence.

In the alternative embodiment the woven polymeric geotextile fabric particulate filtering layer 22 also forms the particulate filtering or sediment filtering for the silt fence 10 of the invention. The mesh size of the woven polymeric geotextile fabric particulate filtering layer 22 will be the smallest of the silt fence fabric 20 and may be selected based upon the requirements of the particular jurisdictions in which the silt fence 10 is to be utilized. The woven polymeric geotextile fabric particulate filtering layer 22 faces the water flow and thus the sediment is prevented from reaching the remaining layers 24 and 26 of the silt fence fabric.

The composite silt fence 10 according to the alternative embodiment of the invention includes the woven polymeric geotextile fabric backing layer 26 discussed above. This layer 26 is for structural support and to protect the pollutant capturing layer 24 of the silt fence fabric 20. This woven polymeric geotextile fabric layer 26 may be formed analogous to the filter layer 22 discussed above and may include warp and weft threads wherein the warp threads extend substantially longitudinally along silt fence fabric 20 while the weft threads extend generally perpendicular to the silt fence fabric 20. The woven polymeric geotextile fabric backing layer 26 of the silt fence fabric 20 may also be formed of a polyolefin or a polyamide material. As this layer 26 is only for structure the mesh opening of the woven polymeric geotextile fabric backing layer 26 is larger than the woven polymeric geotextile fabric particulate filtering layer 22.

In this alternative embodiment the pollutant capturing layer 24 is bonded to the woven polymeric geotextile fabric filtering layer 22 and to the woven polymeric geotextile fabric backing layer 26 in a conventional fashion, such as adhesives or thermal bonding. Thermal boding is easy and avoids separate adhesive materials that could disrupt performance of the fabric 20.

A further alternative embodiment of the present invention is a single layer fabric 20 which utilizes the material forming the pollutant capturing layer 24 described above to form a single mesh layer wherein the mesh opening acts as the particulate filter and the material acts as the pollutant capturing element as well. Specifically a geotextile fabric particulate filtering layer using warp and weft threads as discussed above, where the material forming the pollutant capturing layer discussed above is used to form one or more of the weft threads.

The present invention has been described with reference to specific details of particular embodiments thereof. It is not intended that such details be regarded as limitations upon the scope of the invention except insofar as and to the extent that they are included in the accompanying claims. A number of variations to the present invention will be apparent to those of ordinary skill in the art and these variations will not depart from the spirit and scope of the present invention. The scope of the invention is defined by the appended claims and equivalents thereto.

We claim:

1. A composite silt fence (10) comprising a plurality of spaced stakes (28) and a composite silt fence fabric (20) coupled to the stakes (28) and configured for capturing pollutants within storm water passing through the composite silt fence, wherein the composite silt fence fabric (20) includes i) a polymeric geotextile fabric particulate filtering layer (22) extending the entire width and length of the composite silt fence fabric (10) and defining a hydraulic flow capacity for the silt fence (10), ii) a pollutant capturing layer (24) coupled to the polymeric geotextile fabric particulate filtering layer (22) extending the entire width and length of the composite silt fence fabric (10) so as to entirely overlay the polymeric geotextile fabric particulate filtering layer (22) and configured to capture some select pollutants in water from flow (5) that has passed through the polymeric geotextile fabric particulate filtering layer (22), wherein the pollutant capturing layer (24) is formed including a kenaf material, and iii) a backing layer (26) coupled to the pollutant capturing layer (24) extending the entire width and length of the composite silt fence fabric (10) so as to entirely overlay the pollutant capturing layer (24).

2. The composite silt fence (10) according to claim 1 wherein performing standard ASTM testing on the silt fence with 1645 LBS water with 105 LBS soil and 250 mg/L Oil for a 75 minutes test run yields a soil retention after the test run of greater than 85%.

3. The composite silt fence (10) according to claim 2 wherein the test run yields a soil retention after the test run of greater than greater than 90%.

4. The composite silt fence (10) according to claim 1 wherein performing standard ASTM testing on the silt fence (10) with 1645 LBS water with 105 LBS soil and 250 mg/L Oil for a 75 minutes test run yields a seepage rate after the test run of greater than 60%.

5. The composite silt fence (10) according to claim 4 wherein the test run yields a seepage rate after the test run of greater than 65%.

6. The composite silt fence (10) according to claim 1 wherein performing standard ASTM testing on the silt fence (10) with 1645 LBS water with 105 LBS soil and 250 mg/L Oil for a 75 minutes test run yields a yields an oil retention rate after the test run of greater than 90%.

7. The composite silt fence (10) according to claim 6 wherein the test run yields an oil retention rate after the test run of greater than 95%.

8. The composite silt fence (10) according to claim 1 wherein the polymeric geotextile fabric particulate filtering layer (22) is a non-woven polypropylene particulate filtering layer having a 2-6 ounce rating.

9. The composite silt fence (10) according to claim 1 wherein the backing layer is a 200-300 g/m$^2$ polyethylene layer.

10. The composite silt fence (10) according to claim 1, wherein the pollutant capturing layer (24) is at least one of 1-25 mm in thickness or 60-80 gram/sq. ft.

11. The composite silt fence (10) according to claim 1 wherein the layers (22, 24 and 26) of the silt fence fabric (20) are needle punched together.

12. The composite silt fence (10) according to claim 1 wherein the silt fence fabric (20) has a width of 20"-48" and is rollable.

13. A composite silt fence (10) comprising a plurality of spaced stakes (28) and a composite silt fence fabric (20) coupled to the stakes (28) and configured for capturing pollutants within storm water, wherein the composite silt fence fabric includes i) a woven polymeric geotextile fabric particulate filtering layer (22) exhibiting the minimum mesh size of the silt fence and extending the entire width and length of the composite silt fence fabric (10) and defining a hydraulic flow capacity for the silt fence (10); and ii) a pollutant capturing layer (24) thermally bonded to the woven polymeric geotextile fabric filtering layer and configured to capture through absorption or adsorption some select pollutants in water flow (5) that has passed through the woven polymeric geotextile fabric layer (22) extending the entire width and length of the composite silt fence fabric (10) so as to entirely overlay the polymeric geotextile fabric particulate filtering layer (22), wherein the pollutant capturing layer (24) is formed including a kenaf material.

14. A composite silt fence (10) comprising a plurality of spaced stakes (28) and a composite silt fence fabric (20) coupled to the stakes (28) and configured for capturing pollutants within storm water, wherein the composite silt fence fabric (20) includes i) a polymeric geotextile fabric particulate filtering layer (22) defining a hydraulic flow capacity for the silt fence (10) and extending the entire width and length of the composite silt fence fabric, ii) a pollutant capturing layer (24) coupled to the polymeric geotextile fabric particulate filtering layer (22) and configured to capture some select pollutants in water from flow (5) that has passed through the polymeric geotextile fabric particulate filtering layer (22) and extending the entire width and length of the composite silt fence fabric (10) so as to entirely overlay the polymeric geotextile fabric particulate filtering layer (22), wherein the pollutant capturing layer (24) is formed including a kenaf material.

15. The composite silt fence (10) according to claim 14 wherein the layers (22, 24) of the composite silt fence fabric (20) are needle punched together.

16. The composite silt fence (10) according to claim 14 wherein the pollutant capturing layer (24) is at least one of 1-25 mm in thickness or 60-80 gram/sq. ft.

17. The composite silt fence (10) according to claim 16 wherein performing standard ASTM testing on the silt fence (10) with 1645 LBS water with 105 LBS soil and 250 mg/L Oil for a 75 minutes test run yields a yields an oil retention rate after the test run of greater than 90%.

18. The composite silt fence (10) according to claim 17 wherein the test run yields an oil retention rate after the test run of greater than 95%.

* * * * *